United States Patent
LaFrance

(10) Patent No.: US 9,035,607 B2
(45) Date of Patent: May 19, 2015

(54) VEHICLE CHARGING STATIONS AND METHODS FOR USE IN CHARGING AN ELECTRICALLY POWERED VEHICLE

(75) Inventor: Ryan Marc LaFrance, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 863 days.

(21) Appl. No.: 13/206,026

(22) Filed: Aug. 9, 2011

(65) Prior Publication Data

US 2013/0038284 A1 Feb. 14, 2013

(51) Int. Cl.
*H02J 7/00* (2006.01)
*B60L 11/18* (2006.01)

(52) U.S. Cl.
CPC ......... *B60L 11/1838* (2013.01); *B60L 11/1816* (2013.01); *B60L 11/182* (2013.01); *B60L 11/1846* (2013.01); *B60L 2230/16* (2013.01); *B60L 2270/36* (2013.01); *Y02T 10/7088* (2013.01); *Y02T 10/7005* (2013.01); *Y02T 90/163* (2013.01); *Y02T 90/169* (2013.01); *Y02T 90/121* (2013.01); *Y02T 90/14* (2013.01); *Y02T 90/128* (2013.01); *Y02T 90/122* (2013.01); *Y04S 30/14* (2013.01); *Y02T 90/16* (2013.01); *Y02T 90/168* (2013.01); *Y04S 30/12* (2013.01)

(58) Field of Classification Search
CPC ... Y02T 90/14; Y02T 10/7005; Y02T 90/128; Y02T 10/7088; Y02T 90/163
USPC ....................................................... 320/109
See application file for complete search history.

(56) References Cited

U.S. PATENT DOCUMENTS

| | | | |
|---|---|---|---|
| 5,091,687 A | 2/1992 | Meyer et al. | |
| 5,563,491 A | 10/1996 | Tseng | |
| 5,696,367 A * | 12/1997 | Keith | 235/381 |
| 6,018,293 A * | 1/2000 | Smith | 340/438 |
| 6,429,773 B1 * | 8/2002 | Schuyler | 340/425.5 |
| 6,614,204 B2 | 9/2003 | Pellegrino et al. | |
| 2003/0193404 A1 * | 10/2003 | Joao | 340/825.71 |
| 2010/0013434 A1 | 1/2010 | Taylor-Haw et al. | |
| 2010/0017249 A1 | 1/2010 | Fincham et al. | |
| 2010/0094496 A1 | 4/2010 | Hershkovitz et al. | |
| 2010/0164439 A1 | 7/2010 | Ido | |

(Continued)

OTHER PUBLICATIONS

U.S. Appl. No. 13/205,800, filed Aug. 9, 2011, inventor Ryan Marc LaFrance, entitled: Vehicle Controllers and Methods for Use in Charging an Electrically Powered Vehicle.

(Continued)

*Primary Examiner* — Arun Williams
(74) *Attorney, Agent, or Firm* — General Electric Company

(57) ABSTRACT

Vehicle charging stations and methods for use in charging an electrically powered vehicle are disclosed. One example vehicle charging station includes a power source and a charging device coupled to the power source. The charging device is configured to control a charging process between the power source and an electrically powered vehicle, transmit, via at least one network, a first electronic message to a user, and receive, via the at least one network, a second electronic message from the user. The first electronic message includes at least one condition related to at least one of the charging process and the electrically power vehicle. The second electronic message includes a user command related to the at least one condition.

14 Claims, 6 Drawing Sheets

(56) References Cited

U.S. PATENT DOCUMENTS

2011/0106329 A1* 5/2011 Donnelly et al. ............. 700/291
2011/0202476 A1* 8/2011 Nagy et al. .................... 705/412
2011/0276448 A1 11/2011 Perper et al.
2012/0173074 A1 7/2012 Yasko et al.

OTHER PUBLICATIONS

U.S. Appl. No. 13/205,818, filed Aug. 9, 2011, inventor Ryan Marc LaFrance, entitled: Electrically Powered Vehicles and Methods for Use in Charging a Electrically Powered Vehicle.

* cited by examiner

VEHICLE CHARGING STATIONS AND METHODS FOR USE IN CHARGING AN ELECTRICALLY POWERED VEHICLE

BACKGROUND OF THE INVENTION

The subject matter disclosed herein relates generally to charging electrically powered vehicles and, more specifically, to systems and methods for use in communicating a user profile to a vehicle charging station.

Electrically powered vehicles, including electric vehicles and plug-in hybrid electric vehicles, include electric motors powered by energy storage devices, such as batteries. Because an energy storage device is depleted of energy as the motor is operated, the operator of the vehicle must recharge the energy storage device prior to using the vehicle again.

At least some known vehicle charging stations are provided for public use. Such charging stations are designed to charge the energy storage device when connected to the vehicle. The public use charging stations may require a user to enter information prior to charging the vehicle. In such instances, after a user drives up to the charging station, they are required to get out of their vehicle and manually enter information to the charging station. Information may include, for example, credit card information necessary to pay from energy transferred from the charging station to the vehicle. As such, known charging stations generally require physical interaction with a charging station prior to enter charging and/or payment information. Known charging stations also often require maintaining the vehicle at the charging station for extended periods of time, while the vehicle charges.

BRIEF DESCRIPTION OF THE INVENTION

In one aspect, a vehicle charging station for use in charging an electrically powered vehicle is disclosed. The vehicle charging station includes a power source and a charging device coupled to the power source. The charging device is configured to control a charging process between the power source and an electrically powered vehicle, transmit, via at least one network, a first electronic message to a user, and receive, via the at least one network, a second electronic message from the user. The first electronic message includes at least one condition related to at least one of the charging process and the electrically power vehicle. The second electronic message includes a user command related to the at least one condition.

In another aspect, a method for use in charging an electrically powered vehicle is disclosed. The vehicle charging station includes a power source and a charging device coupled to the power source. The method includes controlling, at the charging device, a charging process between the power source and the electrically powered vehicle, transmitting, via at least one network, a first electronic message to a user, and receiving, via the at least one network, a second electronic message from the user. The first electronic message includes at least one condition related to at least one of the charging process and the electrically power vehicle. The second electronic message includes a user command related to the at least one condition.

In yet another aspect, one or more non-transitory computer-readable storage media having computer-executable instructions embodiments thereon is disclosed. When executed by at least one processor, the computer-executable instruction cause the processor to control a charging process between a power source and an electrically powered vehicle, transmit, via the at least one network, a first electronic message to a user, and receive, via the at least one network, a second electronic message from the user. The first electronic message includes at least one condition related to at least one of the charging process and the electrically power vehicle. The second electronic message includes a user command related to the at least one condition.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
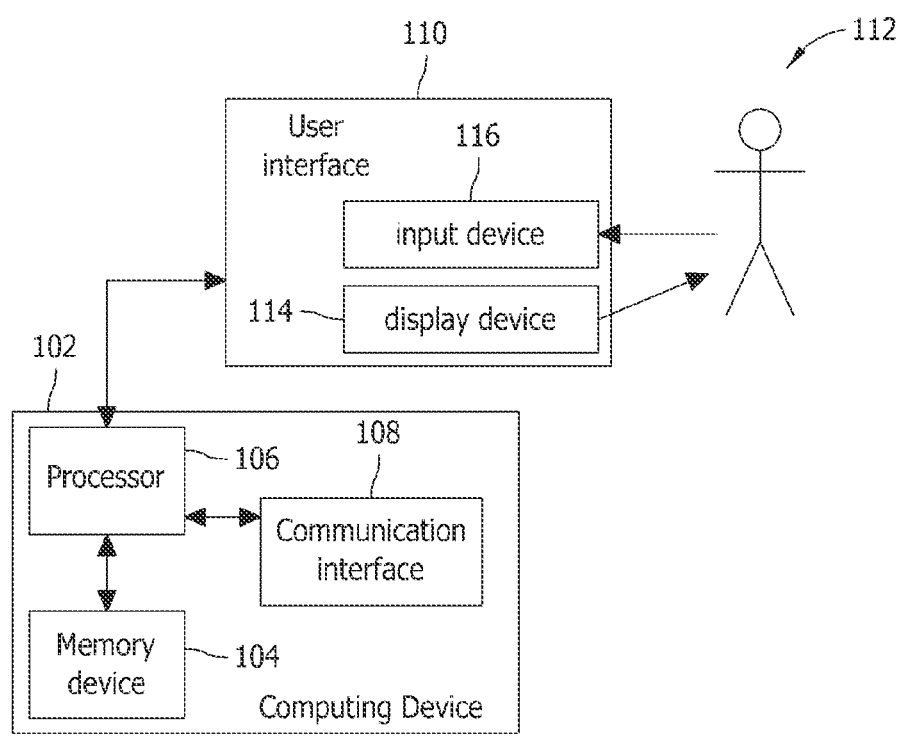
FIG. 1 is a block diagram of an exemplary computing device.

The embodiments described herein relate to communication of information to and/or from an electrically power vehicle and/or a vehicle charging station. More specifically, in some embodiments, a user profile is communicated to a vehicle charging station. In some embodiments, the use of an in-vehicle user interface communicate with a vehicle charging station and/or another device is provided. Some embodiments are related to transmitting and receiving one or more messages to and/or from a vehicle charging station from and/or to a user.

In numerous embodiments, the term "electrically powered vehicle" is used to refer to a vehicle that includes one or more electric motors that are used for propulsion. Energy used to propel electrically powered vehicles may come from various energy storage devices, such as, but not limited to, an on-board rechargeable battery, a capacitor, and/or an on-board fuel cell. In one embodiment, the electrically powered vehicle is a hybrid electric vehicle, which may include both an electric motor and a combustion engine. In another embodiment, an electrically powered vehicle is an electric vehicle, which may include only an electric motor for propulsion. Electrically powered vehicles may capture and store energy generated, for example, by braking. Moreover, some electrically powered vehicles are capable of recharging the energy storage device from a power receptacle, such as a power outlet. Accordingly, the term "electrically powered vehicle" as used herein may refer to any vehicle that includes an energy storage device to which electrical energy may be delivered, for example, via a power grid.

Exemplary technical effects of the methods, systems, and apparatus described herein may include at least one of (a) detecting a vehicle charging station, (b) retrieving a user profile from a memory device in the electrically powered vehicle, and (c) communicating the user profile to the vehicle charging station. The user profile may include, without limitation, billing information, contact information, an alert, and/or a user preference, etc. Another exemplary technical effect of the methods, systems, and apparatus described herein includes at least one of (a) receiving, at an in-vehicle user interface, at least one user input and (b) communicating, via a vehicle controller, a charging parameter to a vehicle charging station in response to the at least one user input.

Other exemplary technical effects of the methods, systems, and apparatus described herein may include at least one of (a) controlling, at a charging device, a charging process including energy transfer between a power source and an electrically powered vehicle, (b) transmitting, via at least one network, a first electronic message to a user, and (c) receiving, via the at least one network, a second electronic message. The first electronic message includes at least one condition related to at least one of the charging process and the electrically power vehicle. The second electronic message includes a user command related to the at least one condition.

FIG. 1 illustrates an exemplary computing device 102. In the exemplary embodiment, computing device 102 includes a memory device 104 and a processor 106 coupled to memory device 104. In some embodiments, executable instructions are stored in memory device 104 and executed by processor 106. Computing device 102 is configurable to perform one or more operations described herein by programming and/or configuring processor 106. For example, processor 106 may be programmed by encoding an operation as one or more executable instructions and providing the executable instructions in memory device 104.

Memory device 104 is one or more devices operable to enable information such as executable instructions and/or other data to be stored and/or retrieved. Memory device 104 may include one or more computer readable media, such as, without limitation, hard disk storage, optical drive/disk storage, removable disk storage, flash memory, non-volatile memory, ROM, EEPROM, random access memory (RAM), etc. Memory device 104 may be configured to store, without limitation, computer-executable instructions, transmitter identifiers, account identifiers, payment account information, and/or any other type of data. Memory device 104 may be incorporated in and/or separate from processor 106.

Processor 106 may include one or more processing units (e.g., in a multi-core configuration). The term processor, as used herein, refers to central processing units, microprocessors, microcontrollers, reduced instruction set circuits (RISC), application specific integrated circuits (ASIC), logic circuits, and any other circuit or processor capable of executing instructions to perform functions described herein.

Computing device 102 includes a communication interface 108 coupled to processor 106. Communication interface 108 is configured to be coupled in communication with one or more other devices, such as another computing device 102, a network, etc. Communication interface 108 may include, without limitation, a serial communication adapter, a wired network adapter, a wireless network adapter, a mobile telecommunications adapter, a radio frequency (RF) receiver, a radio frequency identification (RFID) reader, a keyless entry receiver, and/or any other device capable of communicating with one or more other devices. Communication interface 108 may transmit information to and/or receive information from one or more devices. In one example, a communication interface 108 of one computing device 102 may transmit a user profile to a communication interface 108 of another computing device 102.

In some exemplary embodiments, computing device 102 may be used in combination with a user interface 110 to interact with user 112, such as an operator of a vehicle. As shown in FIG. 1, user interface 110 is separate from computing device 102. User interface 110 may communicate with processor 106 directly or indirectly through one or more communication interfaces 108. In at least one embodiment, user interface 110 may be completely or at least partially included within computing device 102.

User interface 110 may be configured to display information to a user 112. In the exemplary embodiment, user interface 110 includes a display device 114, such as a cathode ray tube (CRT), a liquid crystal display (LCD), an organic LED (OLED) display, an "electronic ink" display, and/or other device suitable to display information. In some embodiments, user interface 110 includes an in-vehicle user interface, such as a display device of a navigation system and/or a media system. As used herein, "in-vehicle" user interface includes an interface coupled, mounted and/or secured to a vehicle (e.g., a vehicle dashboard) and accessible to at least one user 112 while present within the vehicle. Additionally, or alternatively, user interface 110 may include an audio output device (e.g., an audio adapter and/or a speaker, etc.).

User interface 110 may include an input device 116 to receive one or more inputs from user 112. Input device 116 may include, without limitation, a button, a knob, a keypad, a pointing device, a mouse, a touch sensitive panel (e.g., a touch pad or a touchscreen), a gyroscope, a position detector, and/or an audio input (e.g., a microphone). In various embodiments, user interface 110 may include a single component, such as a touchscreen display, incorporating both display device 114 and input device 116.

As described herein, computing device 102 may include one or more devices, servers, and/or controllers of the systems and/or methods described herein.

Figure 2:
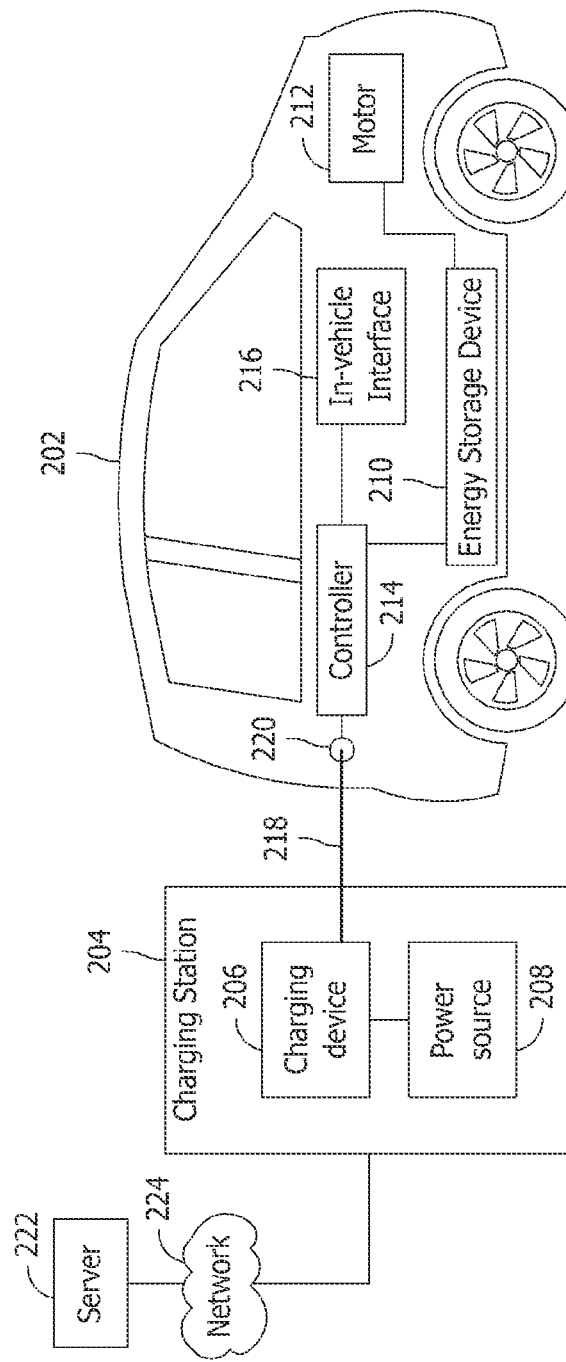
FIG. 2 is a block diagram of an exemplary system for use in charging an electrically powered vehicle.

FIG. 2 illustrates an exemplary system 200 that may be used to charge an electrically powered vehicle 202. In the exemplary embodiment, system 200 includes a vehicle charging station 204 coupled to vehicle 202. Moreover, in the exemplary embodiment, charging station 204 includes a charging device 206 and a power source 208 that is coupled to charging device 206. Power source 208 may include a power grid of an electric utility company, a generator, a battery, an inductor, and/or any other device or system capable of providing electricity to charging device 206.

Vehicle 202 includes at least one energy storage device 210, such as a battery and/or a capacitor, coupled to a motor 212. In the exemplary embodiment, vehicle 202 includes vehicle controller 214 and in-vehicle user interface 216 coupled to vehicle controller 214. While vehicle controller 214 is illustrated as being a single component and is described with reference to multiple functions herein, it should be appreciated that vehicle controller 214 may include multiple, separate controllers disposed throughout vehicle 202 in other embodiments. As such, each of the multiple vehicle controllers may be associated with one or more of the functions described herein.

In the exemplary system 200, a charging conduit 218 is releasably coupled between charging station 204 and energy storage device 210 and/or to vehicle controller 214. Charging conduit 218 may permit energy transfer from power source 208 to vehicle 202. Alternatively, a wireless conduit may permit energy transfer from power source 208 to vehicle 202, as shown, for example, in FIG. 3. Regardless of the type of conduit employed, energy is generally transferred during a charging process from power source 208 to energy storage device 210 to charge energy storage device 210.

Referring again to FIG. 2, charging conduit 218 may include at least one conductor for supplying electrical energy to energy storage device 210 and/or to any other component within vehicle 202, and at least one conductor for transmitting information to, and/or receiving information from, vehicle controller 214 and/or any other component within vehicle 202. Charging conduit 218 may couple to vehicle 202 at a charging receptacle 220. When charging conduit 218 includes at least one power conductor (not shown) and at least one data conductor (not shown), charging receptacle 220 may include an integrated power-data receptacle to connect to both the power and data conductors.

Additionally, or alternatively, charging conduit 218 may include a cable with one or more conductors for supplying electricity to vehicle 202, without a separate and dedicated conductor for communicating information to/from vehicle 202. In such an embodiment, information may be embedded in one or more power signals transmitted through charging conduit 218 between vehicle charging station 204 and vehicle 202. In still other embodiments, data may be communicated between vehicle 202 and/or charging station 204 through a wireless connection. Charging receptacle 220 may be configured differently in various embodiments to provide appropriate connections between charging station 204 and vehicle 202.

As shown, charging device 206 is coupled to a server 222 through a network 224. Server 222 may communicate with charging device 206, for example, to acknowledge/confirm an aspect of the user profile, to communicate a user response to an electronic message, and/or to perform any other function that enables system 200 to function as described herein. Network 224 may include, without limitation, the Internet, a local area network (LAN), a wide area network (WAN), a wireless LAN (WLAN), a mesh network, a virtual private network (VPN), a cellular network, and/or any other network that enables system 200 to function as described herein. In various embodiments, one or more of charging device 206, vehicle controller 214, and server 222 are connected to network 224.

Further, one or more of charging device 206, vehicle controller 214, and/or server 222 may be instances of computing device 102. It should be appreciated that charging device 206, vehicle controller 214, and/or server 222 may include more or less components than illustrated in the computing device 102 in other embodiments.

Methods and systems described herein may include communicating information to and/or from an electrically powered vehicle, a vehicle charging station, and/or other devices. Communicating information may generate efficiency and/or increase safety and security for a user and/or the user's information, while providing additional functionality. In various embodiments, information may be communicated prior to initiating a charging process, during the charging process, and/or after the charging process.

In the exemplary embodiment, controller 214 of vehicle 202 includes memory device 104 and processor 106. Memory device 104 stores at least one user profile. The user profile may include, without limitation, billing information, contact information for user 112, an alert, a user preference, a vehicle identification, a vehicle manufacturer, a vehicle model, an AC profile, a limitation of energy storage device 210, a type of energy storage device 210, and/or other information related to vehicle 202, charging station 204, and/or a charging process, etc.

A user preference may include a charging time, a dollar amount, a price per unit power threshold, a voltage level, a current level, a rate threshold, a process for mitigating charging errors, a process for presenting/handling alerts, a request for a charge-time remaining indicator, a request to process/ignore charging station 204 diagnostics, and/or other information or preferences associated with a user, etc. In at least one embodiment, a user preference may be based on a location. For example, a user preference may request sufficient energy transfer to permit a vehicle 202 to return to a user's residence, which may be less than a complete charge of energy storage device 210. In such an example, controller 214 may communicate with a navigation system (including in-vehicle user interface 216) to determine a location of vehicle 202, a location of the user's residence, and estimate energy required to return to the user's residence.

Prior to communicating the user profile to charging station 204, vehicle 202 may detect charging station 204. In the exemplary embodiment, detection may be initiated by either vehicle 202 or charging station 204, but preferably results in each of vehicle 202 and charging station 204 detecting the other.

In the exemplary embodiment, vehicle 202 and/or charging station 204 may be detected by one or more sensors. In one example, charging receptacle 220 may include a sensor to detect the presence of charging conduit 218 inserted therein. The sensor may include, for example, a switch. The sensor permits vehicle 202 and/or vehicle controller 214 to detect charging conduit 218, thereby detecting charging station 204. Conversely, a sensor may be associated with charging conduit 218, such that charging station 204 detects vehicle 202 when charging conduit 218 is inserted into charging receptacle 220. In another embodiment, charging station 204 may includes a weight sensor to detect the presence of vehicle 202 over charging station 204.

Additionally, or alternatively, charging station 204 may utilize communication in order to detect vehicle 202, or vice-versa. Specifically, for example, charging device 206 may initiate communication by transmitting an identification signal to its generally vicinity via communication interface 108. When a vehicle 202 pulls up to charging station 204, vehicle 202 may receive the identification signal and generate a response signal through communication interface 108 to establish communication with charging station 204. Consequently, vehicle 202 detects charging station 204, and charging station 204 detects vehicle 202. It should be appreciated that an identification signal may be transmitted by a vehicle and received by a charging station in other embodiments.

In the exemplary embodiment, the identification signal may be transmitted consistently from vehicle 202 or charging station 204. Additionally, or alternatively, the identification signal may be transmitted in response to a user input. For example, user 112 may pull up to charging station 204 and provide an input to in-vehicle user interface 216, causing processor 106, in combination with communication interface 108, to transmit an identification signal. Charging station 204, in turn, receives the identification signal and responds. As such, each of vehicle 202 and charging station 204 has detected the other. It should be appreciated that various signals in various orders may be communication between, vehicle controller 214, vehicle 202, charging station 204 and/or charging device 206 to permit detection of one or both of vehicle 202 and charging station 204.

Once charging station 204 is detected, processor 106 of controller 214 retrieves the user profile from memory device 104 and communicates the user profile to charging station 204. In the exemplary embodiment, processor 106 automatically retrieves the user profile from memory device 104 and automatically communicates the user profile to charging station 204. In other embodiments, a user input to input device 116 may be required to retrieve and/or communicate the user profile. In at least one embodiment, a user input may be required to selected one of a plurality of user profiles stored in memory device 104.

Once charging station 204 receives the user profile, charging station 204 may enable energy transfer from the power source 208 to vehicle 202 at least partially based on the user profile. Accordingly, at least a portion of information required by charging station 204 to initiate a charging process is communicated to charging station 204, without user 112 manually entering the content of the user profile. In this manner, communicating the user profile to charging station 204 may provide increased safety, security and efficiency over known methods of entering information to a charging station. Specifically, for example, billing information is not entered to charging station 204 in plain view of others. Additionally, or alternatively, communicating the user profile from vehicle controller 214 may provide increased safety, security and efficiency over known methods, because a payment device (e.g., a credit card, debit card, key-chain radio frequency identification (RFID) device, a mobile telephone, or other device linked to a payment account) is not publicly handled by user 112, such that it may become lost. Moreover, the user profile, including billing/contact information, is passed electronically so that user profile is embedded in a communication between vehicle controller 214 and charging station 204 and outside the plain view of others.

Apart from billing and contact information, the user profile may include other information, such as one or more user preferences. In the exemplary embodiment, for example, the user profile may include a charging time. When user 112 pulls up to charging station 204, charging station 204 may charge vehicle 202 according to the charging time defined in the user profile without one or more inputs from user 112.

Similarly, the user profile may include a preferred notification when an alert is generated, so that user 112 is notified in a particular manner if, for example, a charging error occurs. In another example, the user profile may include information related to a charging rate threshold (dollar per watt), such that charging station automatically initiates a charging processes with the current rate of energy is below the rate threshold. Further, as the number and variety of electrically powered vehicles grows, a number of variables necessary to properly/safely charge vehicle 202 may also increase. For example, one type of vehicle 202 may require 240 VAC to charge, while another type of vehicle 202 may require 480 VAC to charge. The user profile may be used in various exemplary embodiments to provide any and/or all information to charging station 204 to facilitate charging, thereby potentially obviating a user's need to directly interact with the charging station 204.

In the exemplary embodiment, charging device 206 may evaluate the user profile prior to initiating an energy transfer to verify information and/or confirm if additional information is needed. For example, charging device 206 may communicate through network 224 to verify and/or authorize billing information prior to permitting energy transfer to vehicle 202. In another example, charging device 206 may access one or more networks to verify information and/or provide further functionality during a charging process. For example, the content of a user profile may provide a basis to offer one or more advertisements to user 112 before, during or after a charging process.

Additionally, or alternatively, a user profile may include only a portion of the information necessary to initiate a charging process. For example, a user profile may include billing information, contact information, and an AC profile, but not include a charge time. In this manner, a user profile may supply information routinely entered by a user, but does not include other information that a user may want to adjust for each charging process. Information not included in the user profile may be provided by a user to charging station 204, for example, through in-vehicle user interface 216, consistent with the methods described herein.

The user profile may be defined by user 112 in several different ways. In one exemplary embodiment, the user profile may be defined by use of display device 114 and input device 116 of in-vehicle user interface 216. Vehicle controller 214 may display multiple messages to user 112 through display device 114 to elicit one or more inputs from user 112 to input device 116 to define the user profile. For example, user 112 may be prompted at display device 114 to enter a preferred charging time. In response to the prompt, user 112 may enter an input to inputs device 116 to enter or select about 30 minutes, about 2 hours, about 4 hours, or another suitable time, etc. Once defined, the user profile is stored in memory device 104 of vehicle controller 214 for communication to charging station 204. In several embodiments, the user profile may be defined through another interface to vehicle controller 214. For example, a user communication device, such as a smartphone or personal computer, may communicate, via network 224, with communication interface 108 of vehicle controller 214 to define the user profile. It should be appreciated that a user profile may be defined by entering a new user profile and/or editing an existing user profile. Further, multiple user profiles may be created and/or edited. Specifically, for example, multiple user profiles may include, without limitation, a short charge profile, medium charge profile, long charge profile, top off profile, etc.

In the exemplary embodiment, vehicle 202 includes in-vehicle user interface 216 and vehicle controller 214 coupled in communication with in-vehicle user interface 216. In-vehicle user interface 216 includes at least one input device 116 configured to receive an input from user 112. Vehicle controller 214 is configured to receive a user input from in-vehicle user interface 216 and communicate a charging parameter to vehicle charging station 204 in response to the user input.

Charging parameters may include any parameters to initiate, alter and/or terminate a charging process. In the exemplary embodiment a charging parameter may include, without limitation, an instruction related to a charging process, a selection of a charging process option, billing information, contact information, an alert, a user preference, a vehicle model, an AC profile, a limitation of energy storage device 210, a type of energy storage device 210, and/or any other information associated with the charging process, vehicle 202, charging station 204 and/or user 112.

In the exemplary embodiment, user 112 may be able to communicate with charging station 204 from within vehicle 202. As such, user 112 is able to communicate with charging station 204 without exiting vehicle 202, thereby providing for the safety, security and/or convenience of user 112. Moreover, communicating billing information, for example, to charging station 204 from within vehicle 202 may provide additional privacy and security, as compared to entering such information outside vehicle 202 in plain view of others.

Further, in several embodiments, use of in-vehicle user interface 216 may permit additional functionality of vehicle 202, without the addition of display and/or input devices. More specifically, in the exemplary embodiment, in-vehicle user interface 216 may be included in a system of vehicle 202 intended to perform at least one other function, such as navigation, entertainment, etc. For example, in-vehicle user interface 216 may be incorporated with an audio system, a visual system, a navigation system, a media system and/or any other system within vehicle 202. In one exemplary embodiment, in-vehicle user interface 216 includes a touchscreen display (e.g., display device 114 and input device 116) of a navigation system. A navigation system may include any system suitable for providing location and/or or direction information. A media system may include any system suitable to provide radio, CD, MP3, video, DVD, gaming, telecommunications and/or other media functionality.

In several embodiments, in-vehicle user interface 216 may include display device 114 and input device 116. Input device 116 is provided to receive one or more inputs from user 112. Display device 114 may be utilized to solicit inputs from user 112 and/or display one or more messages from charging station 204. In one example, charging station 204 may transmit a message to vehicle 202 requesting a charging time. In turn, display device 114 displays a request for a charging time to user 112. User 112 may provide an input to input device 116 entering or selecting a charging time. Vehicle controller 214, in turn, transmits a charging parameter (e.g., the charging time) to charging station 204. In another example, a user profile may contain only a portion of information needed to initiate a charging process for vehicle 202. After charging station 204 receives the user profile, charging station 204 may transmit a message requesting information not included in the user profile. In turn, a request may be displayed to user 112 at display device 114, and user 112 may then select or enter, via input device 116, information requested by charging station 204. Vehicle controller 214 receives the one or more user inputs and communicates at least one charging parameter, based on the user inputs, to provide the information requested by charging station 204.

It should be appreciated that in one or more embodiments, a user input to in-vehicle user interface 216 may be in response to a message originating from a device other than charging station 204.

In the exemplary embodiment, communication between charging station 204 and in-vehicle user interface 216 may be controlled by vehicle controller 214. In such exemplary embodiments, vehicle controller 214 may be configured to transmit and/or receive messages to and/or from in-vehicle user interface 216 or other components or vehicle 202 according to one or more formats and/or protocols. In the exemplary embodiment, vehicle 202 includes a packet-based, wired connection between vehicle controller 214 and in-vehicle user interface 216. In-vehicle user interface 216 may include, for example, a vehicle audio system. As such, vehicle controller 214 may be configured to receive and/or transmit message according to a radio data system (RDS) format to permit vehicle controller 214 to transmit/receive formatted messages to/from the vehicle audio system. Additionally, or alternatively, vehicle controller 214 may be configured to transmit and/or receive messages to and/or from charging station 204 according to one or more formats and/or protocols. For example, vehicle controller 214 may be configured to transmit packet-based messages to charging station 204 through charging conduit 218.

In the exemplary embodiment, the functionality of charging station 204 may be affected when vehicle 202 is coupled to charging station 204. For example, a display device and/or an input device of charging station 204 may be disabled when charging station 204 is connected in communication with vehicle 202. Disabling the display device and/or input device of charging station 204 may prevent input of information from multiple sources and/or display of user information at charging station 204. In alternative embodiments, one or both of a display device and an input device of charging station 204 may be enabled, when charging station 204 is coupled in communication with vehicle 202.

Figure 3:
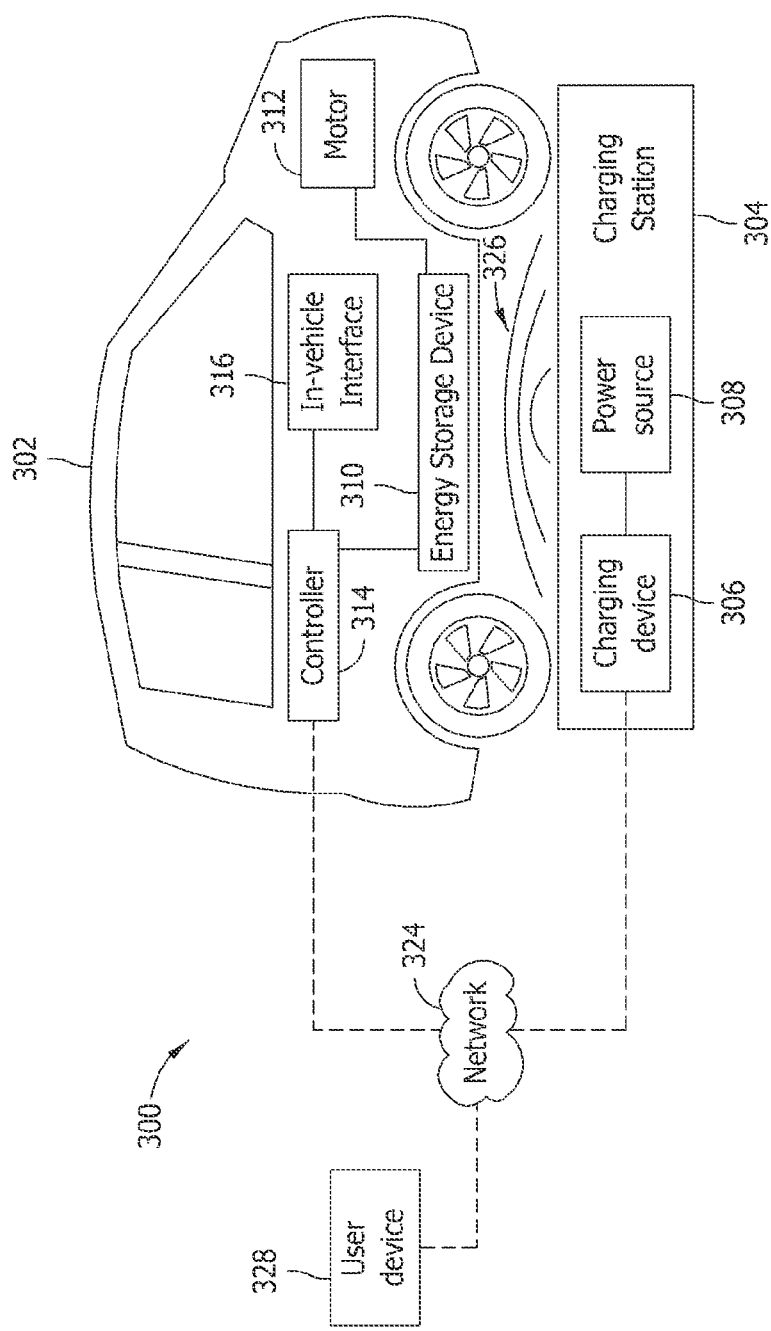
FIG. 3 is a block diagram of an alternate system that may be used to charge an electrically powered vehicle.

FIG. 3 illustrates system 300 according to another example embodiment of the present disclosure. System 300 includes an electrically powered vehicle 302 and a vehicle charging station 304. Charging station 304 includes a charging device 306 and a power source 308 coupled to charging device 306. Charging device 306 controls energy transfer from power source 308 to vehicle 302. In this exemplary embodiment, a magnetic/electric field 326 is radiated from charging station 304 to transfer energy to vehicle 302, and more specifically an energy storage device 310 included in vehicle 302. Contrary to the exemplary embodiment of FIG. 2, including charging conduit 218, magnetic/electric field 326 permits wireless transfer of energy between charging station 304 and vehicle 302. It should be appreciated that wired energy transfer or wireless energy transfer may be used alone, or in combination, in one or more other embodiments.

In addition to energy storage device 310, vehicle 302 includes a motor 312, a vehicle controller 314, and an in-vehicle user interface 316 coupled to vehicle controller 314. In the exemplary embodiment, vehicle controller 314 is coupled to network 324 through communication interface 108. As shown, communication interface 108 permits wireless communication between vehicle 302 and charging station 304, via network 324. As indicated above, network 324 may include, without limitation, the Internet, a local area network (LAN), a wide area network (WAN), a wireless LAN (WLAN), a mesh network, a virtual private network (VPN), a cellular network, and/or any other network that enables system 300 to function as described herein.

In the exemplary embodiment, because energy transfer and communication between charging station 304 and vehicle 302 are wireless, a user 112 may initiate and complete a charging process, without exiting vehicle 302 to attached a charging conduit or enter information to charging station 304. By permitting user 112 to remain in the vehicle during a charging process, system 300 provides increased security, safety and/or convenience to user 112 over know methods and systems for charging an electrically powered vehicle. It should be appreciated that in other embodiment, such as illustrated in FIG. 2, charging conduit 218 may be automatically connected to vehicle 202 prior to a charging process, such that even when a physical connection for energy transfer is present, user 112 may complete a charging processes without exiting vehicle 202.

In the exemplary embodiment, charging station 304 includes power source 308 and charging device 306 for controlling energy transfer from power source 308 to vehicle 302. Charging device 306 is configured to transmit, via network 324, a first electronic message to user 112 and receive, via network 324, a second electronic message from user 112. The first electronic message including a condition related to at least one of the charging process and vehicle 302. The second electronic message including a user command related to the condition.

By transmitting the electronic message to user 112, charging device 306 is able to promptly notify user 112 of one or more conditions. In the exemplary embodiment, vehicle controller 314 may be coupled to an on-board computer of vehicle 302 to access information related to various sensors, such as tire pressure, window state, etc., and/or an alarm system of vehicle 302 to receive alarm indication. Accordingly, conditions may include, without limitation, a status of a charging process, an amount of energy transferred, a status, a charging error, or other information related to the charging process. Additionally, or alternatively, the condition may include, without limitation the state of a window (i.e., open or closed), a tire pressure, oil change indicator, an unauthorized access (e.g., a break-in), a temperature, etc. The prompt notification of any of the conditions may permit user 112 to more quickly respond to the condition, which may increase efficiency and/or security while vehicle 302 is charging.

In one example, a condition may include a charging error, and the first electronic message may indicate the charging error to user 112. The first message may also indicate that the charging process has been suspended. If the error occurs after only 10 minutes into a two-hour charging process, for example, user 112 may not have realized the charging error until returning to vehicle 302 after a couple hours. By notifying user 112 of the error promptly, user 112 may address the error and re-initiate the charging process, without the loss of substantial charging time. In the exemplary embodiment, the user command of the second message may be sufficient to mitigate the charging error and re-imitate charging of vehicle 302. For example, a user command may accept a longer charge time, a different voltage or a partial charge in order to resume a charging process.

In another example, user 112 may be notified via the first electronic message that one or more windows of vehicle 302 are open during inclement weather. User 112 may be able to promptly return to vehicle 302 to adjust one or more windows as dictated by weather. Alternatively, the user command of the second message may direct vehicle controller 314 to adjust (directly or through a different computing device) the state of the windows according to the weather.

In yet another example, a charging process may cease based on an energy rate (dollar per watt) that exceeds a user preference. When the charging process ceases, charging device 306 and/or vehicle controller 314 may transmit the first electronic message to user 112 indicating the current energy rate. In response, user 112 may transmit the second message including a command to re-initiate charging of vehicle 302, notwithstanding the energy rater exceeding the user preference. It should be appreciated that various other alterations and/or changes may be implemented by a user via a user command in the second electronic message. In at least one embodiment, user 112 may initiate a message to charging device 306 and/or controller 314, without a prior electronic message from charging device 306.

The first and second electronic messages may include a SMS message, a voicemail message, an email message or other electronic message suitable for transmission over network 224, etc. The electronic messages may be received/transmitted by user 112 at a communication device 328, such as, without limitation, a cellular phone, a pager, a smartphone, a personal computer, a laptop, a tablet, a workstation, a security system, or any other device suitable to receive and/or send an electronic message.

As explained above, charging station 304 may communicate with vehicle 302 in response to the second message. Alternatively, charging station 304 may communicate to a third party in response to the second message. For example, when a condition indicates an unauthorized access of vehicle 302 or charging station 304, a message to a third-party may include a message to security personnel, a local authorities or police. In another example, when a condition indicated all four tire are flat, a message to a third party may include a message to security personnel, a local authorities or police, indicating vandalism and/or tires of vehicle 302 have been slashed. Messages to one or more other third-parties related to the condition of the first message and/or a user command of the second message should be considered within the scope of the present disclosure.

Figure 4:
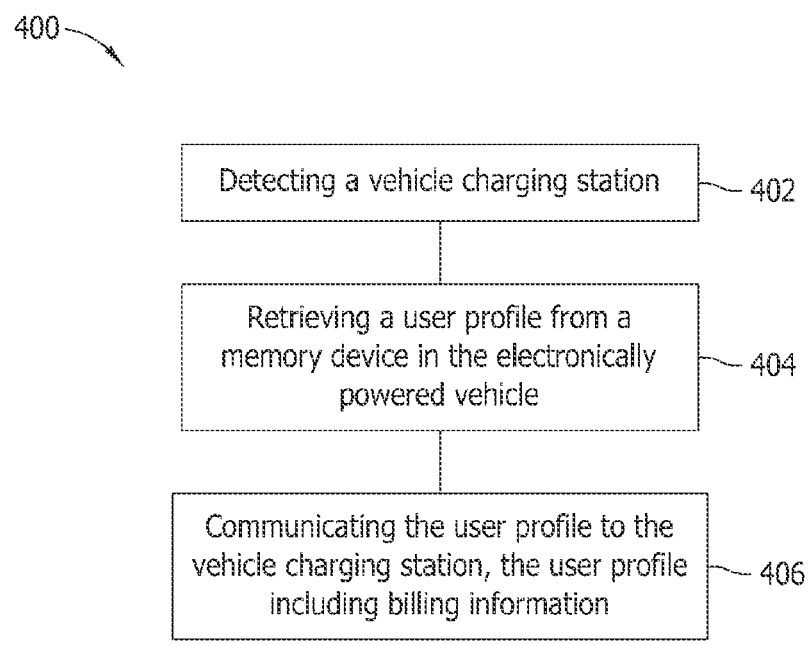
FIG. 4 is a flowchart of an exemplary method for use in charging an electrically powered vehicle.
Figure 5:
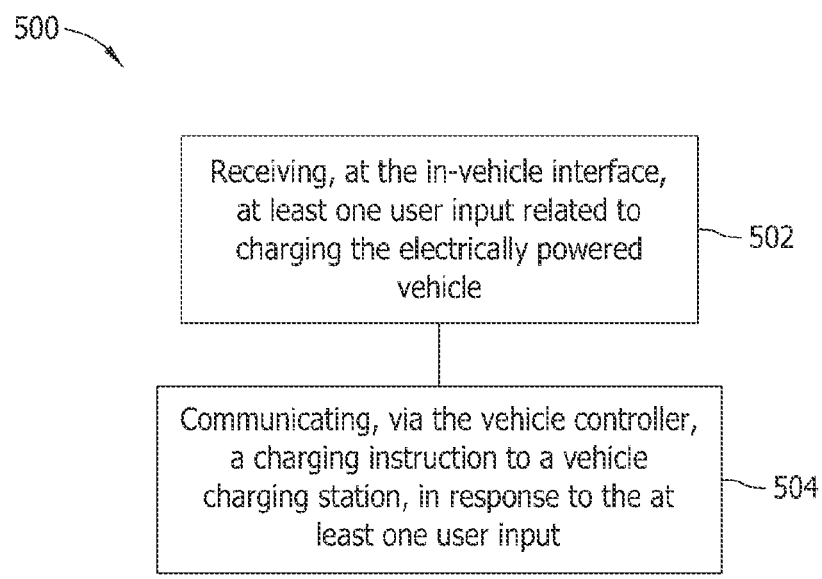
FIG. 5 is a flowchart of an alternate method that may be used to charge an electrically powered vehicle.
Figure 6:
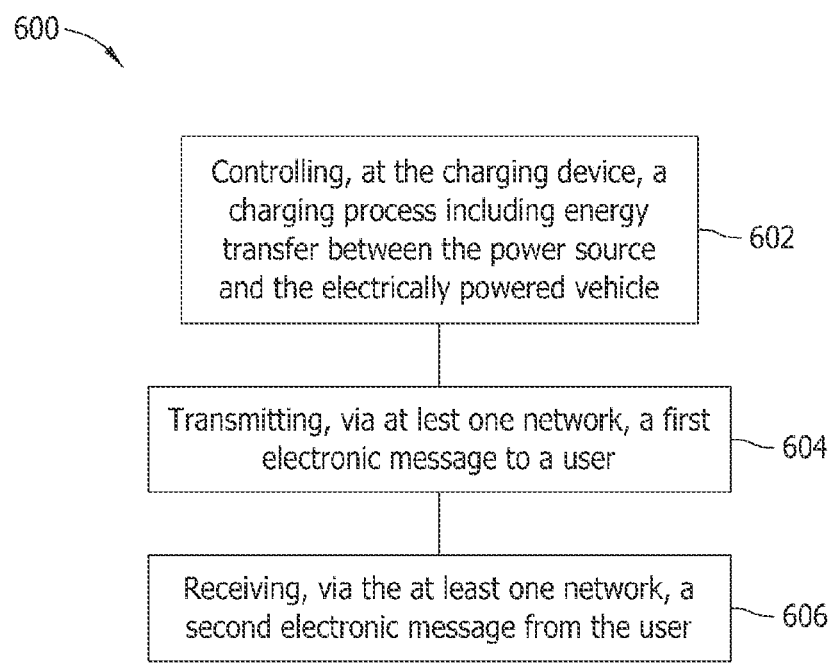
FIG. 6 is a flowchart of yet another alternate method that may be used to charge an electrically powered vehicle.

Methods illustrated in FIGS. 4-6 are described below with reference to system 300. It should be appreciated that the methods described herein are not limited to system 300. Likewise, system 300 should not be understood to be limited to one or more of the methods described herein. FIG. 4 illustrates method 400 according to an exemplary embodiment of the present disclosure. Method 400 includes detecting 402 a vehicle charging station, retrieving 404 a user profile from a memory device in the electrically powered vehicle, and communicating 406 the user profile to the vehicle charging station, the user profile including billing information.

Method 400 may include receiving at least one message from vehicle charging station 204 and displaying, at a display device 114, the at least one message to user 112. Method 400 may also include receiving a user profile from user 112 and storing the user profile in memory device 104. Furthermore, method 400 may include receiving an input to in-vehicle user interface 316 to define the user profile.

FIG. 5 illustrates method 500 according to an exemplary embodiment of the present disclosure. Method 500 includes receiving 502, at in-vehicle user interface 316, at least one user input and communicating 504, via vehicle controller 314, a charging parameter to vehicle charging station 304 in response to the at least one user input. Method 500 may include displaying, at in-vehicle user interface 316, at least one charging option to user 112, and wherein the at least one user input selects the at least one charging option. Method 500 may also include displaying, at in-vehicle user interface 316, at least one message from vehicle charging station 304. Method 500 may include establishing a wireless connection between electrically powered vehicle 302 and vehicle charging station 304.

FIG. 6 illustrates method 600 according to an exemplary embodiment of the present disclosure. Method 600 includes controlling 602, at the charging device, a charging process including energy transfer between the power source and the electrically powered vehicle, transmitting 604, via network 324, a first electronic message to user 112 and receiving 606, via network 324, a second electronic message. The first electronic message includes at least one condition related to at least one of the charging process and electrically power vehicle 302. The second electronic message includes a user command related to the at least one condition.

Method 600 may include transmitting the user command to electrically powered vehicle 302. Method 600 may also include transmitting a third message to a third-party in response to the user command. Moreover, method 600 may include altering the charging process in response to the user command to mitigate the charging error.

While the above functions and systems have been described with reference to system 200 or system 300, it should be appreciated that various system embodiments may be employed to enable one or more of the functions described herein. More specifically, systems described herein should not be understood to be limited to one or more methods described herein, while methods described herein should not be understood to be limited to the particular embodiments illustrated herein. Accordingly, several different system embodiments and/or several different method embodiments are described herein without limitation.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems and methods.

While certain functions and/or operations are described above with respect to particular devices, it is contemplated that any device may perform one or more of the described operations. Systems and methods described herein may limit the manual interaction between a charging station and a user of the charging station. Further, the systems and methods described herein may efficiency and conveniently utilize one or more in-vehicle interfaces to communicate with charging station, rather than known interfaces, which are specific to and/or included in charging stations. Further still, the systems and methods described herein may provide communications between a user and a charging station, while the user is away from the charging station.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle charging station for charging an electrically powered vehicle, said vehicle charging station comprising:
    a power source; and
    a charging device coupled to said power source, said charging device configured to:
        control a charging process between said power source and an electrically powered vehicle;
        transmit, via at least one network, a first electronic message from said charging device to a user device that is separate from the electrically powered vehicle and said vehicle charging station, the first electronic message including a charging error related to the charging process; and
        receive, via the at least one network, a second electronic message from the user device, the second electronic message including a user command that alters the charging process to mitigate the charging error.

2. The vehicle charging station of claim 1, wherein the first message includes one of a SMS message and an email message.

3. The vehicle charging station of claim 2, wherein the at least one network includes a wireless cellular network.

4. The vehicle charging station of claim 1, wherein said charging device is configured to alter the charging process in response to the user command.

5. The vehicle charging station of claim 1, wherein said charging device is configured to transmit the user command to the electrically powered vehicle.

6. The vehicle charging station of claim 1, wherein said charging device is configured to receive a user profile from the electrically powered vehicle, wherein the user profile includes contact information, and wherein the charging device is configured to transmit the first message based on the contact information.

7. The vehicle charging station of claim 1, wherein said charging device is configured to receive a user profile from the electrically powered vehicle, and wherein the user profile includes contact information.

8. A method for use in charging an electrically powered vehicle at a charging station, the vehicle charging station including a power source and a charging device coupled to the power source, said method comprising:
    controlling, at the charging device, a charging process between the power source and the electrically powered vehicle;
    transmitting, via at least one network, a first electronic message from the charging device to a user device that is separate from the electrically powered vehicle and the charging station, the first electronic message including a charging error related to the charging process; and
    receiving, via the at least one network, a second electronic message, from the user device, the second electronic message including a user command that alters the charging process to mitigate the charging error.

9. The method of claim 8, wherein transmitting via at least one network includes transmitting via a cellular network.

10. The method of claim 9, wherein transmitting the first electronic message includes transmitting one of a SMS message and an email message.

11. The method of claim 10, further comprising transmitting the user command to the electrically powered vehicle.

12. The method of claim 10, further comprising transmitting a third message to a third-party in response to the user command.

13. One or more non-transitory computer-readable storage media having computer-executable instructions embodiments thereon, wherein when executed by at least one processor, said computer-executable instruction cause the processor to:
    control a charging process between a power source and an electrically powered vehicle;
    transmit, via at least one network, a first electronic message from a charging device to a user device that is separate from the electrically powered vehicle and the charging device, the first electronic message including a charging error related to the charging process; and
    receive, via the at least one network, a second electronic message from the user device, the second electronic message including a user command that alters the charging process to mitigate the charging error.

14. The one or more computer-readable storage media of claim 13, wherein the computer-executable instruction cause the processor to receive a user profile from the electrically powered vehicle, and wherein the user profile includes billing information and contact information.

* * * * *